(12) United States Patent
Holman et al.

(10) Patent No.: US 11,004,100 B2
(45) Date of Patent: *May 11, 2021

(54) SYSTEM AND METHOD FOR COORDINATING A CAMPAIGN FOR OBSERVERS OF REAL-WORLD DATA

(71) Applicant: Observa, Inc., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/239,494

(22) Filed: Aug. 17, 2016

(65) Prior Publication Data
US 2018/0053201 A1 Feb. 22, 2018

(51) Int. Cl.
*G06Q 30/02* (2012.01)
(52) U.S. Cl.
CPC ..... *G06Q 30/0217* (2013.01); *G06Q 30/0201* (2013.01)
(58) Field of Classification Search
CPC .................. G06Q 30/0201; G06Q 30/0207
See application file for complete search history.

(56) References Cited

U.S. PATENT DOCUMENTS

| | | | | |
|---|---|---|---|---|
| 6,026,387 A * | 2/2000 | Kesel | ..... | G06Q 30/02 706/45 |
| 6,633,851 B1 * | 10/2003 | Engler | ..... | G06Q 10/10 705/21 |
| 8,064,896 B2 * | 11/2011 | Bell | ..... | H04L 12/1859 455/422.1 |
| 9,361,353 B1 | 6/2016 | Aristides | | |
| 9,508,082 B1 | 11/2016 | Mannix et al. | | |
| 2003/0009373 A1 | 1/2003 | Ensing et al. | | |

(Continued)

OTHER PUBLICATIONS

The reliability and validity of objective measures of customer service: mystery shopping J Dawes, B Sharp—Australian Journal of Market Research, 2000—researchgate.net (Year: 2000).*

(Continued)

*Primary Examiner* — Jonathan G Sterrett
(74) *Attorney, Agent, or Firm* — FisherBroyles LLP; Kevin D. Jablonski (57) ABSTRACT

Systems, apparatuses, and methods for observing and collecting real-world data about conditions, standards, guidelines, rules and restrictions established by a coordinator of an observation campaign. One embodiment may include a user-based mobile computing device (e.g., a smart phone) configured to execute an observation application to coordinate observing and collecting of real-world data. Further, the system may include an observation server computer configured to send notifications that include one or more opportunities for observations of real-word data to the user-based mobile computing device and configured to receive real world data observed and collected by the user-based mobile computing device. Further yet, the system may include a coordinator-based computing device communicatively coupled to the observation server computer and configured to generate and control a campaign of opportunities sent by the observation server computer.

19 Claims, 5 Drawing Sheets

(56) References Cited

U.S. PATENT DOCUMENTS

| | | | |
|---|---|---|---|
| 2004/0034684 A1* | 2/2004 | Payne | G06Q 10/10 709/201 |
| 2005/0149382 A1 | 7/2005 | Fenner et al. | |
| 2006/0167971 A1 | 7/2006 | Breiner | |
| 2008/0183552 A1 | 7/2008 | O'Hagan | |
| 2009/0063306 A1 | 3/2009 | Fano et al. | |
| 2009/0204471 A1 | 8/2009 | Elenbaas et al. | |
| 2009/0240516 A1 | 9/2009 | Palestrant | |
| 2010/0171826 A1 | 7/2010 | Hamilton et al. | |
| 2011/0212717 A1 | 9/2011 | Rhoads et al. | |
| 2012/0029978 A1* | 2/2012 | Olding | G06Q 10/06 705/7.42 |
| 2012/0047008 A1 | 2/2012 | Alhadeff et al. | |
| 2012/0265574 A1* | 10/2012 | Olding | G06Q 10/06 705/7.14 |
| 2013/0018957 A1* | 1/2013 | Parnaby | G06Q 50/01 709/204 |
| 2013/0079128 A1 | 3/2013 | Thomas et al. | |
| 2013/0132170 A1 | 5/2013 | Yelisetti et al. | |
| 2013/0132987 A1* | 5/2013 | Narasimhan | H04N 21/25866 725/14 |
| 2013/0204652 A1 | 8/2013 | Marins et al. | |
| 2013/0282446 A1* | 10/2013 | Dobell | G06Q 10/06398 705/7.42 |
| 2014/0180772 A1 | 6/2014 | Tutupata et al. | |
| 2014/0249889 A1 | 9/2014 | Park et al. | |
| 2014/0278850 A1* | 9/2014 | Boccuzzi, Jr. | G06Q 30/0208 705/14.11 |
| 2014/0324555 A1 | 10/2014 | Wu et al. | |
| 2014/0343984 A1* | 11/2014 | Shahabi | G06Q 10/06311 705/7.13 |
| 2014/0379399 A1 | 12/2014 | Brydon et al. | |
| 2015/0032533 A1 | 1/2015 | Raab et al. | |
| 2015/0178742 A1 | 6/2015 | Smith et al. | |
| 2015/0213315 A1* | 7/2015 | Gross | G06F 16/5838 382/159 |
| 2015/0254593 A1 | 9/2015 | Rinze et al. | |
| 2015/0347520 A1 | 12/2015 | King et al. | |
| 2015/0356489 A1 | 12/2015 | Kazai et al. | |
| 2016/0027051 A1* | 1/2016 | Gross | G06Q 50/16 705/14.54 |
| 2016/0078499 A1 | 3/2016 | Brown et al. | |
| 2016/0180365 A1 | 6/2016 | Shi et al. | |
| 2016/0253710 A1 | 9/2016 | Publicover et al. | |
| 2016/0350697 A1* | 12/2016 | Gruen | G06Q 10/06395 |
| 2017/0053330 A1 | 2/2017 | Smith et al. | |
| 2017/0098197 A1 | 4/2017 | Yu et al. | |
| 2017/0221156 A1* | 8/2017 | Mingarelli | G06Q 50/01 |
| 2017/0249574 A1 | 8/2017 | Knijnik et al. | |
| 2017/0331877 A1 | 11/2017 | Balasubramanian et al. | |
| 2018/0293616 A1 | 10/2018 | Greenhood | |

OTHER PUBLICATIONS

The future of hotel rating W Hensens—Journal of Tourism Futures, 2015—emeraldinsight.com (Year: 2015).* http://web.archive.org/web/20150226150240/http://www.gigwalk.com/crowdsourcing (Year: 2015).* http://web.archive.org/web/20150223140532/http://www.gigwalk.com/case-study/Gigwalk_mobileretail_whitesheet.html (Year: 2015).*

Position validation in crowdsourced accessibility mapping RM Rice, AO Aburizaiza, MT Rice . . . —. . . : The International Journal . . . , 2016—utpjournals.press (Year: 2016).*

The motivations and experiences of the on-demand mobile workforce R Teodoro, P Ozturk, M Naaman, W Mason . . . —Proceedings of the 17th . . . , 2014—dl.acm.org (Year: 2014).*

ISR/WO dated Jan. 30, 2018 for PCT/US17/062829; filed Nov. 21, 2017.

Grocery & Retail News. "Get Paid for Snooping on Your Supermarket," <URL: http://couponsinthenews.com/2016/05/16/get-paid-for-snooping-on-your-supermarket/>.

ISR/WO dated Mar. 8, 2018; for PCT/US17/062816, filed Nov. 21, 2017.

Transferring Knowledge from a Crowd to a Retail Company—A case study of Roamier Sweden S. Gistera, M. Carlander—2015—diva-portal.org (2015).

"A Conceptual Model for Mystery Shopping Motivations", P. Allison, D. Severt, D. Dickson—Journal of Hospitality Marketing & . . . , 2010—Taylor & Francis (2010).

Exploring the Consequences of Shopper-Facing Technologies: Their Effect on Shopper Experiences and Shopping Outcomes; Bi Spaid—2014—trace.tennessee.edu (2014).

Applying the service profit chain in a retail environment: Challenging the "Satisfaction mirror", R. Silvestro, S. Cross—International Jounral of Service Industry . . . , 2000—emeraldinsight.com (Year: 2000).

"Applying the service profit chain to analyse retail performance: the case of the managerial strait-jacket?" M. Pritchard, R. Silvestro—International Journal of Service . . . , 2005—emeraldinsight.com (Year: 2015).

"Crowdforge: Crowdsourcing complex work", A.Kittur, B. Smus, S. Khamkar, RE Kraut—Proceedings of the 24th annuity . . . , 2011-dl.acm.org (Year: 2011).

"Quality control in crowdsourcing systems: Issues and directions" M. Allahbakhsh, B. Benatallah, A. Ignjatovic . . . —IEEE Internet . . . , 2013—ieeexplore.ieee.org (Year: 2013).

Morse, David; "MINISIZE2; A computer program for determining effect size and minimum sample size for statistical significance for univariate, multivariate, and nonparametric tests", Educational and Psychological Measurement; 1999—journals.sagepub.com (Year: 1999).

* cited by examiner

| CAMPAIGN 300 | Total Cost Outlay 310 |
| --- | --- |
| | Cost per Observation 311 |
| | Total Number of Observations 312 |
| | Time Frame 313 |
| | Geographic Limitations 314 |
| | Diminishing Cost per Observation 315 |
| | Observer Reputation Limitations 316 |
| | Variable Cost Per Transaction 317 |
| | Failure Parameters 318 |
| | Image Quality Parameters 319 |
| | Opportunity/Acceptance Lockout 320 |
| | Observation Success Termination 321 |

SYSTEM AND METHOD FOR COORDINATING A CAMPAIGN FOR OBSERVERS OF REAL-WORLD DATA

BACKGROUND

Individuals and businesses often desire to collect data about various situations that exist in the real-world. For example, a manufacturer of a product may wish to collect data about how the product is being displayed at a retail location. However, individuals and enterprises, government and non-governmental agencies often do not have the time and/or resources available to travel to myriad locations or employ agents to do so. This challenge becomes amplified as the time window for the information collection becomes more specific and/or the physical locations from which the information is to be collected grow in number or distance. For example, merchants in the delivery chain of products for retail sale, whether manufacturers, wholesalers, brokers, or the like, may need to determine if, when, how much, in what way or condition, or at what price their goods are being put in front of consumers. Another example might be a property or business owner that contracts for a periodic service about which they would like to validate the quality and completeness of service delivery. In short, the condition of physical locations, or some physically observable condition at the locations is desirable data to observe, obtain, and document.

Sometimes these needs for data occur in a predictable recurring pattern. The data may also be best obtained within a narrow time window. For example, a restaurant owner checking on bathroom cleanliness may only desire to obtain the information for the first hour in which a restaurant is open, as after that, customers may have used the bathrooms extensively. In another example, merchants who sell goods and products through retailers often have guidelines, rules, and restrictions for how various retailers are to present and price the goods and products at the purchase location. For example, merchants may wish to negotiate with retailers for specific shelf space for the merchant's goods and products or the merchant may wish to disallow lowering of the retail price for the merchant's goods and products.

Individuals and business wishing to obtain observable real-world data may hire staff to ensure that the various standards, conditions, guidelines, rules, and/or restrictions are met. That is, employees or agents may travel to various locations at various times to observe and collect the real-world data with regard to various conditions, guidelines, rules, and/or restrictions in order to ensure satisfaction and compliance. Of course, such employees and agents can be expensive in terms of payroll and travel expenses. Therefore, organizations often must rely on others to follow the negotiated conditions, guidelines, rules, and restrictions. However, at times, those other actors often have little incentive to go to any great length to ensure that standards or conditions are met or to ensure compliance with applicable guidelines, rules, and/or restrictions. As a result, many businesses are unable to ensure that their standards, conditions, guidelines, rules, and/or restrictions are followed with regularity.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the systems and methods discussed herein may be directed to an observation platform for coordinators, merchants, retailers, and users to establish, utilize and fulfill an observation campaign suited to verify real-world implementations surrounding observable, standards, conditions, rules, guidelines, and/or restrictions. The observable data points may be part of an overall strategy in an observation campaign established by an observation campaign coordinator. Such a strategy may often involve determining data points like specific product placement, product pricing, and product incentives at the retail location. A user of this platform, called an observer hereinafter, may use an application downloaded to and executing on a computing device, to identify specific observation campaign opportunities. An observation campaign may be a set of verifiable parameters that define specifics about an observation campaign strategy. These verifiable parameters may include specific observable and verifiable real-world data such as where a product is placed on a retail shelf, whether promotional materials are displayed with the product, inventory count and product pricing.

Once an opportunity is identified and accepted, the user may collect the real-world data through various methods including, key entry, temperature observance, sound recording, video recording, barometric pressure observance, sound-pressure level observance and image capture (using one or more applications executing on a computing device, such as a mobile phone). The captured real-world data may then be uploaded to the observation platform in order to determine if the parameters of the observation campaign have been met (e.g., correct data, clear image, timely collection, and the like). If the collected and now uploaded real-world data is verified, then the merchant may be notified of a new valid observation and the observer may be compensated (financial or otherwise) for successfully collecting real-world data as part of an observation campaign. These and other aspects are described in greater detail below with respect to FIGS. 1-5.

Figure 1:
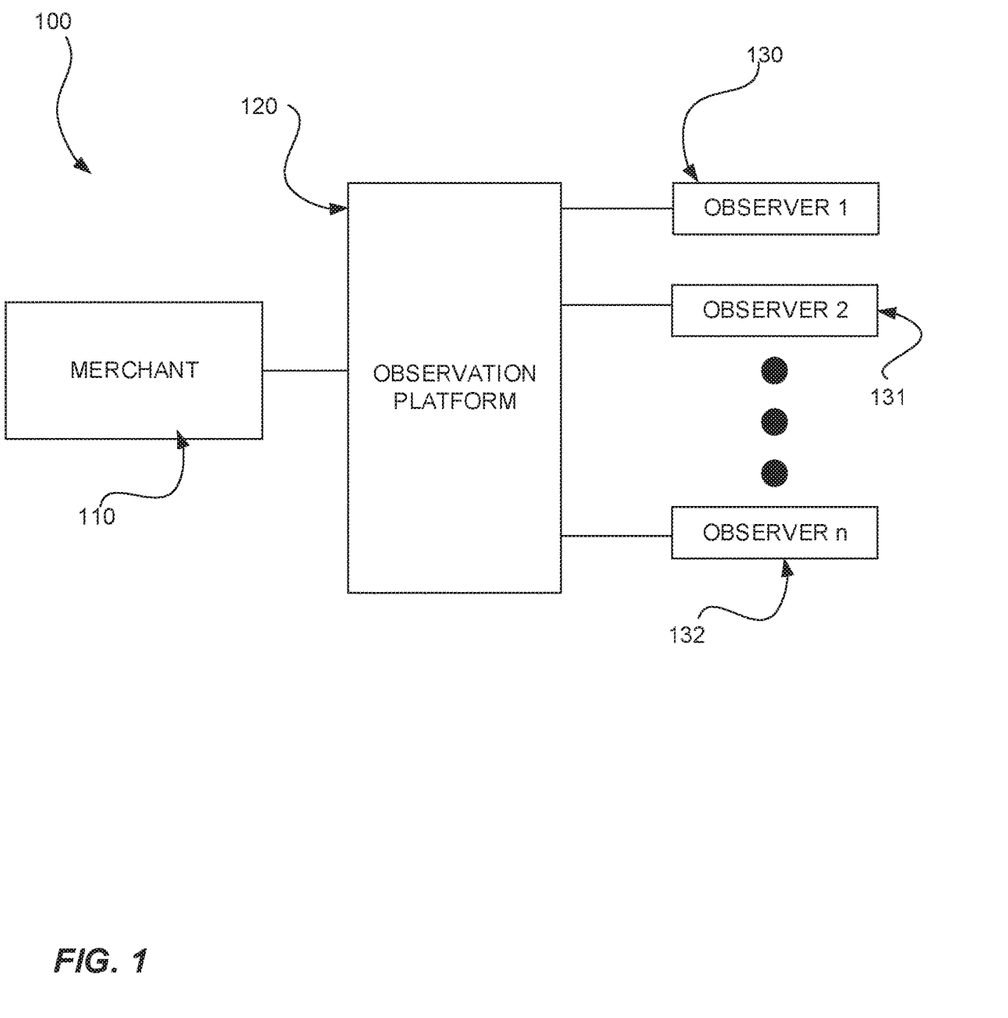
FIG. 1 is a basic block diagram illustrating elements or components of an example system in which an embodiment of the subject matter disclosed herein may be implemented.

FIG. 1 is a basic block diagram illustrating elements or components of an example system 100 in which an embodiment of the subject matter disclosed herein may be implemented. In the context of FIG. 1 and other figures, a continuing example of a merchant 110 will be used. Thus, various real-world data points specific to a merchant will also be used in context. A skilled artisan understands that the coordinator of an observation campaign need not be a merchant with merchant-specific data points. For example, a coordinator of an observation campaign may be a quality assurance coordinator seeking to collect data about installations of observable projects, e.g., power transmission pole installations, bathroom conditions in public transit, traffic conditions, and the like. In short, a coordinator of an observation campaign may be any individual, business, government agency, or entity that wishes to incentivize observers to collect real-world data from myriad locations. However, for ease of illustration and for consistent examples, the remaining disclosure will use the merchant product and retail location example without limiting the interpretation of the claims or specification.

As discussed briefly above in an overview, an observation platform 120 provides systems and methods for a merchant 110 to establish and implement an observation campaign for various observers 130, 131, and 132 to collect real world data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-5 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device. Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign. Various operations and parameters of the observer computing devices 130, 131, and 132 are also described further below with respect to FIG. 2.

Figure 2:
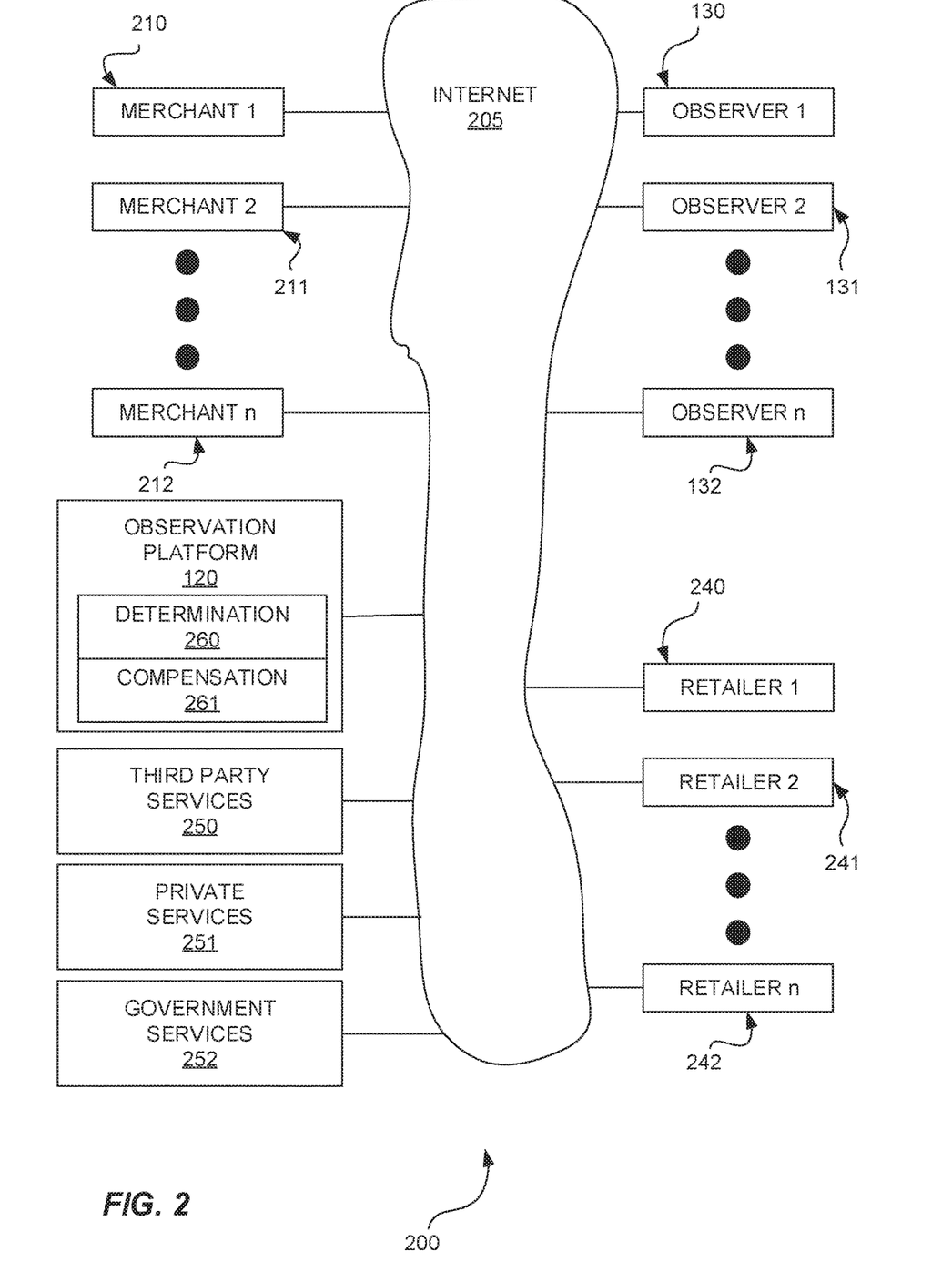
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan understands that the designation of observer 1 130 through observer n 132 indicates that any number of merchants may be shown as interfacing with the system 200 (whether such interfacing is discrete or collaborative). In this system 200 embodiment, more than one merchant computing device is shown. Thus, merchant computing devices 210, 211, and 212 may represent different merchants who may individually and independently craft observation campaigns on the observation platform 120 via the network 205. A skilled artisan understands that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of retailer computing devices 240, 241, and 242. A skilled artisan understands that the designation of retailer 1 240 through retailer n 242 indicates that any number of merchants may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed next.

By way of general overview of the system in FIG. 2, one embodiment may include a user-based mobile computing device 130 (e.g., a mobile phone, a smart phone, a laptop computer, and handheld computer, a wearable computing device, an augmented reality device, and the like) configured to execute an observation application to coordinate observing and collecting of real-world data. Further, the system may include an observation server computer 120 configured to send notifications that include one or more opportunities for observations of real-word data to the user-based mobile computing device 130 and configured to receive real world data observed and collected by the user-based mobile computing device 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers) to collect real-world data about products and goods for sale at various retail locations. These parameters of a campaign are discussed further below with respect to FIG. 3. For now, the relationship with observers and merchants is discussed next.

A merchant that establishes an observation campaign using the observation platform 120 desires to know more about the retail locations and point of sale for goods and products in the marketplace. For example, a merchant may negotiate a deal to have products placed at specific eye-level locations on shelves at retail locations and may wish to verify that the products are, in fact, placed on eye-level shelves at the various retail locations. By establishing an observation campaign eliciting this kind of real-world data (e.g., digital images of the product for sale on eye-level shelves at a particular retail location), the merchant can incentivize observers (through compensation offered by the observation platform) to fulfill the requirements of the specific real-world data collection. That is, the merchant may enable an observation campaign through a contract with a proprietor of the observation platform such that the observation platform then offers monetary compensation to one or more observers in exchange for a timely and meaningful collection of real-world data (e.g., a picture) of the merchant's product for sale at a specific retail location. This eliminates the need for the merchant to employ one or more individuals to travel to the retail location to verify such real-world data.

As used herein, the term real-world data may refer to specific observable facts about anything of interest to the coordinator of the campaign. Real-world data may be data that can be collected in the real world (as opposed to data that may reside on a retailer's computer). In one example, real-world data may be a digital image of a product for sale at a retail location such that data may be gleaned from the image, such as product location on a shelf, product location in proximity to other product, product label facing outwards, product price can be seen, product price is correct, additional promotional material is proximate, and the like. Real-world data includes any observable verifiable data point collectable through any manner of sensing, recording, or observing.

In this manner, any merchant can use the observation platform to design an observation campaign to incentivize observers to collect very specific kinds of real-world data at very specific locations over very specific time frames. When designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as retail locations in a specific city or within 100 miles of a particular location. Further yet, the merchant may establish observation opportunities based on a desired total number of observation—e.g., a cap of 10 different successful observations. Any number of other campaign parameters are possible and discussed further below with respect to FIG. 3.

As opportunities for observation become active (that is, users of the observer application may be offered opportunities via the application) various observers may engage in the various opportunities. Opportunities may be sent as notifications to observers (via a smart phone application and the like). Such notifications may be influenced by geographic location of various observers (e.g., notifications are only sent to observers proximate to a desired observation retail location). Further, such notification may be influenced by a relative reputation of an observer (e.g., only the "best" observers receive certain opportunities).

Once an opportunity is received, the observer may accept the opportunity and begin an observation. Some opportunities may have time limits for acceptance of the opportunity and/or time limits for fulfillment of an accepted opportunity. The observation may be simply sending the requested real-world data to the observation platform 120 for evaluation. The observation platform may include a module for determining 260 whether the received real-world data from any observer meets the requirements and parameters of an opportunity in an active observation campaign. The determination module 260 may be configured to determine if the received real-world data from the observer (e.g., sent from user-based mobile computing device) fulfills one or more criteria for data collection in the observation campaign opportunity. Such criteria may include timeliness, image quality, data applicability, data completeness and the like.

If the determination module 260 determines that the received real-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observers that fulfilled the opportunity. Further, the compensation module may also track total financial compensation to specific observers and communication said total to government services 252 on an annual or other periodic basis. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

Figure 3:
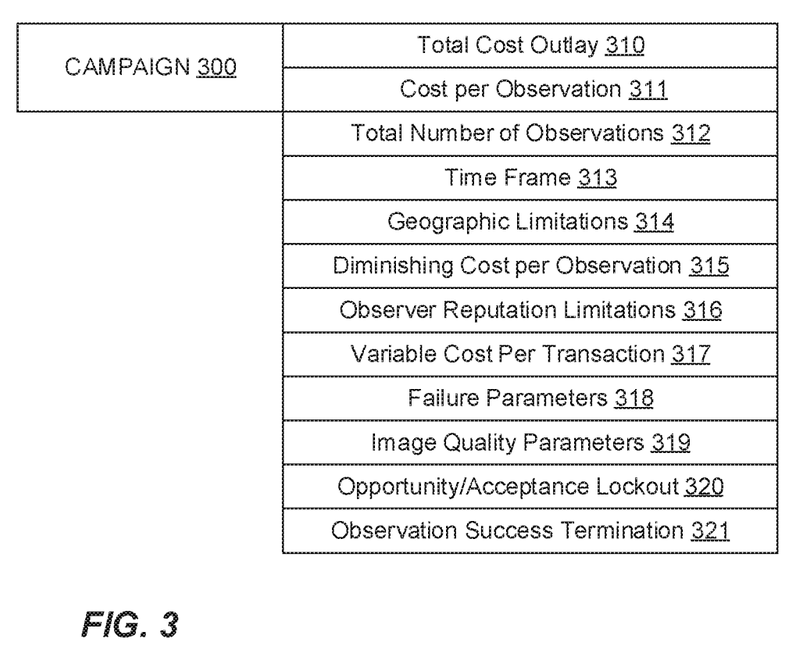
FIG. 3 is a data structure diagram illustrating parameters of an example observation campaign used in conjunction with the system of FIG. 2 according to an embodiment of the subject matter disclosed herein.

FIG. 3 is a data structure diagram illustrating parameters of an example observation campaign 300 used in conjunction with the system of FIG. 2 according to an embodiment of the subject matter disclosed herein. As discussed above, one or more merchants (210-212 of FIG. 2) may establish and coordinate an observation campaign with several different configurable parameters. FIG. 3 is an illustration of a data structure of one embodiment of an observation campaign 300. It is understood that the parameters shown in FIG. 3 are illustrative and any number of parameters (either greater of fewer than shown in FIG. 3) may be present. These parameters assist in shaping how observers will be incentivized to collect real world data in response to opportunities presented in the campaign 300. It is also understood that certain identification and demographic parameters (such as merchant name, merchant product, bank data, and the like) may also be established with respect to the merchant. These are not discussed here as the focus of FIG. 3 is on the customizable parameters of an observation campaign 300.

A first parameter in which a merchant may customize an observation campaign 300 is a total cost outlay 310. In this respect, the merchant and the proprietor of the observation platform reach an agreement about the total cost of the observation campaign. The observation platform may then set specific compensation rates for successful observation in order to meet the needs of the established observation campaign. Further, the merchant or the observation platform may choose to designate a maximum (or minimum) amount of financial compensation to be awarded to observers for successfully retrieving real-world data in fulfillment of an observation opportunity. This may be an aggregated amount on a per campaign basis. For example, a merchant may wish to collect data about as many product placements as possible until a threshold amount of money has been reached (in terms of financial compensation to all observers in an aggregate manner). This total may also be an aggregate cost outlay for non-financial outlay (e.g., a limit of 10 discount coupons awarded).

In addition to the total cost outlay, the merchant may also configure a parameter associated with a total cost per observation 311. In this manner, the individual observation may be capped at a maximum amount of financial or non-financial compensation. The merchant may also define a minimum cost per observation and can establish a sliding scale for cost per observation according to a number of different variables. For example, the merchant may choose to pay more per observation for the first 10 observations and then drop the cost per observation. As another example, the cost per observation may be more during a particular time period, such as late night and then less during a different time period, such as morning. Thus, additional parameters regarding variable cost per transaction 317 may be configured.

The merchant may configure a parameter associated with a total number of observations 312. In this manner, each observation may be counted and once a limit has been reached, the campaign is suspended. The merchant may also define a minimum number of observations needed in order for a campaign to end at a time limit or within a time frame 313. Still further, the merchant may establish a fixed time frame 313 in which the campaign must begin and end. For example, the merchant may choose to establish a time frame of June $1^{st}$ to June $30^{th}$ for which a total number of observations in limited to 1000. Once 1000 observations are reached, the campaign may end. Also, the merchant may establish 100 observations as a minimum threshold in which case, the campaign can only end on June $30^{th}$ if 100 observations are entered.

The merchant may configure a parameter associated with a geographic limitation 314 of the campaign. Several geographic parameters may be established, such as a relative geographic limit of a state, city of country or an absolute geographic limit of within 500 miles of a specific location (company headquarters, for example). There may be additional parameters about limiting the number of observation within geographic regions or limiting the total cost outlay according to geographic region. Further yet, cost per observation may be configured on a per region basis (e.g., paying more for region 1 than region 2).

The merchant may configure a parameter associated with a diminishing cost per observation 315, choosing to pay more for initial observations when compared to later observations. The parameters may be reversed to pay more for each additional observation after a certain threshold has been reached. Further, the merchant may limit observers who can participate in a campaign to only observers who have reached a specific observer reputation score or ranking 316.

Additional parameters in a campaign may include failure parameters 318 that may suspend a campaign if a threshold of failed observations are entered or the real-world data collected in initial observations indicates that additional failures will be imminent or predictable. There may be restrictions on the type and quality of images received from observers based on image quality parameters 319. The merchant may establish opportunity lockout parameters 320 for observers who accept an opportunity and then are given two hours of exclusivity to the opportunity to fulfill it. Lastly, in this embodiment, a merchant may define a successful campaign termination parameter 321 so that a campaign may ends when a threshold number of successful observations has been reached or a statistically valid number of successful observations is reached. There are additional parameters that may be configured in an observation campaign 300, but are not discussed herein for brevity.

Figure 4:
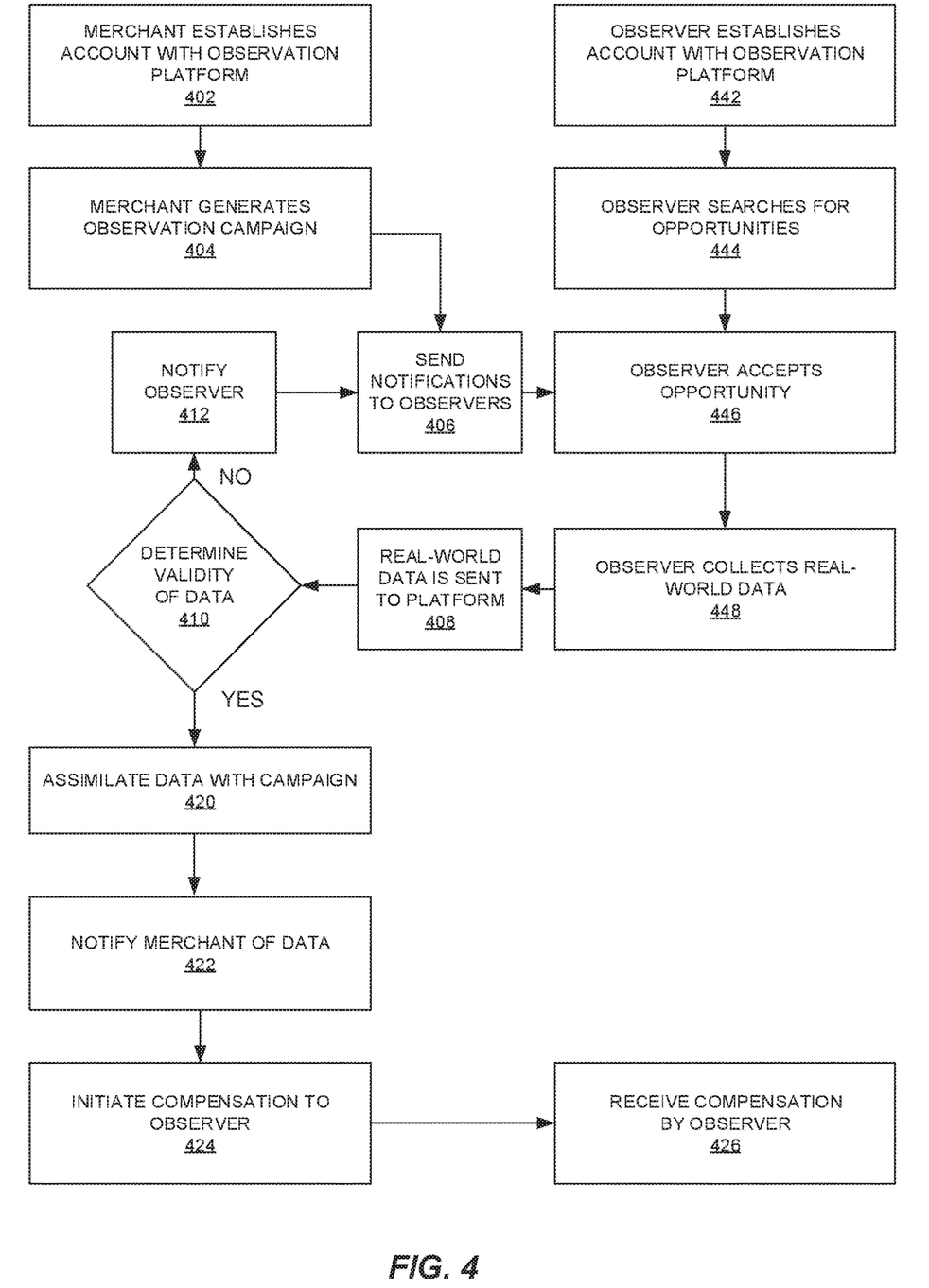
FIG. 4 is a method flow diagram illustrating a method for operating an observation campaign using the example system of FIG. 2 according to an embodiment of the subject matter disclosed herein.

FIG. 4 is a method flow diagram illustrating a method for operating an observation campaign using the example system of FIG. 2 according to an embodiment of the subject matter disclosed herein. As a general overview of the computer-based method shown in FIG. 4, merchants and observers may utilize various computing devices and the observation platform to establish and send an electronic communication (e.g., push notification, pull notification, text, email, and the like) corresponding to an opportunity to observe real-world data. Such a communication may be sent to one or more remote computing devices of one or more observers from the observation platform. Observers may then collect real world data, and in response to the opportunity, send the real world data to the observation platform. The observation platform may then determine if the response (the real-world data) fulfills the opportunity. If so, the observation platform may initiate compensation to the observer that fulfilled the opportunity. These and other aspects of the underlying methods are described further below.

At the outset, the method of FIG. 4 may begin with contemporaneous (or not contemporaneous) actions on the part of merchants and observers. For the remainder of the discussion with regard to FIG. 4, the merchants and observers will be referred to in a singular sense, although it is understood that there may be many simultaneously acting merchants and observers with respect to the observation platform. Thus, a merchant may establish an account (download software and applications, register as a user/merchant, and the like) with the observation platform at step 402 and generate (at step 404) an observation campaign with one or more of the parameters discussed previously with respect to FIGS. 2 and 3. Additionally, an observer may establish an account with the observation platform at step 442 (download software and applications, register as a user/observer, and the like) and search for opportunities at step 444.

Once a merchant establishes and publishes an observation campaign, various opportunity notifications may be sent to observers at step 406. The notifications may be globally pushed to all observers in one embodiment. In other embodiments, the notifications may be selectively pushed or pulled to users based on proximity to opportunities, observer reputation or any other delineation between various observers using the observation platform. Having various opportunities in which to browse, an observer may accept an opportunity at step 446. At step 448, the observer may collect the requested real-word data from a retail location (e.g., an image of a product on a shelf, an image of the price tag, an image of promotional materials and the like). This real-world collected data may then be sent to the observation platform at step 408.

Once real-world data is received from an observer, the observation platform may use various established criteria (established by parameters of an observation campaign for example) to determine if the received data is valid. A valid set of real-world data may meet specific criteria such as quality clear digital images, quantity of the received data, and quantity of the required data such as price and location. The observation platform may determine at step 410 that the received data is not valid in which case a notification may be sent to the observer indicating the failure at step 412. After the failure, a notification may be sent again to various observers at step 406 and the process may repeat. If the observation platform determines that the received data is valid at step 410, then the data may be assimilated into the observation campaign for additional manipulation and processing at step 420. Further, the merchant may be notified though an electronic communication of a successful observation at step 422. Further yet, the observation platform may initiate compensation to the observer at step 424 while the observer may then receive the compensation at step 426. After a successful observation, the observer may also receive follow-on notifications in response to the successful observation. Such follow-on notifications may be additional opportunities for just the observer of the successful observation.

Figure 5:
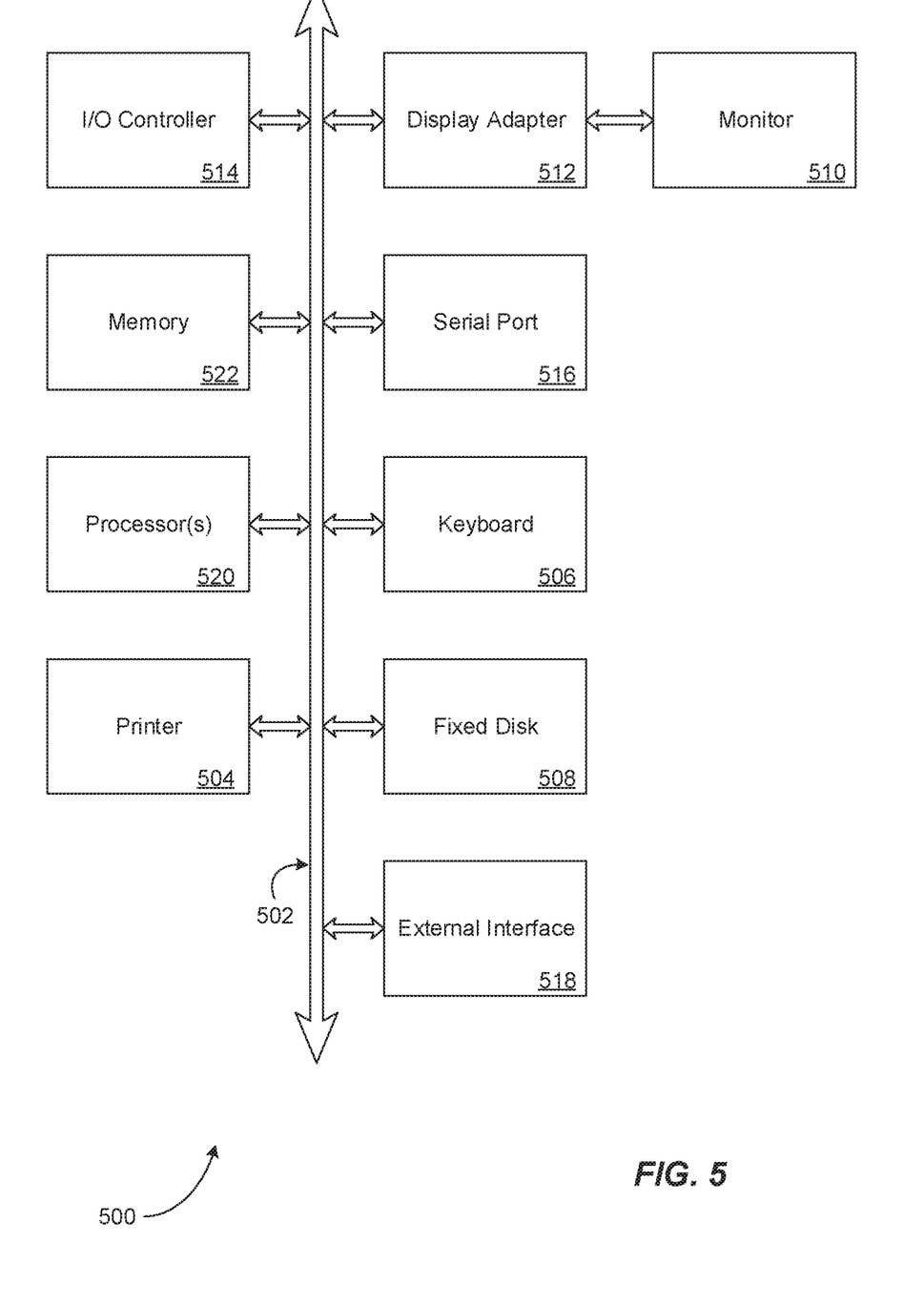
FIG. 5 is a diagram illustrating elements or components that may be present in a computer device or system configured to implement a method, process, function, or operation in accordance with an embodiment.

FIG. 5 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method, comprising:
    sending an electronic communication as a push notification corresponding to an opportunity to observe real-world data, the electronic communication sent to one or more remote computing devices of one or more users, wherein the electronic communication is sent based upon a detected proximity of the one or more remote computing devices to a location associated with the opportunity, the one or more remote computing devices executing a real-world observance opportunity application having a pre-established relationship with a real-world observance opportunity platform, the electronic communication sent from a data observation computing platform executing the real-world observance opportunity, the opportunity comprising a first limited time window that is a subset of a business day in which observance of real-world data can fulfill the opportunity;
    receiving a response to the electronic communication from at least one of the remote computing devices of at least one of the users within a second limited time window, the response including data corresponding to an observation of real-world data, the response comprising audio visual data about a product for sale and meta data about the location of the product;
    determining that the response fulfills the opportunity in response to an analysis that is executed by the real-world observance opportunity platform wherein the analysis determines that the audio visual data and the meta data each meet at least one corresponding threshold of at least one or more corresponding criteria;
    in response to determining a successful response, generating a compensation influence parameter based upon previous successful observations by at least one user and previous successful observations corresponding to an opportunity campaign that encompasses the real-world observance opportunity;
    initiating compensation to the at least one user in response to the threshold being met and in response to the compensation influence parameter; and
    sending a push notification to the at least one user indicating that compensation has been initiated.

2. The computer-based method of claim 1, further comprising assimilating the data from the response into a database of similar data.

3. The computer-based method of claim 1, further comprising executing an application at the at least one remote computing device for coordinating the opportunity.

4. The computer-based method of claim 1, further comprising establishing an observation campaign that includes the opportunity communicated to at least one of the users and also includes additional opportunities communicated to other users.

5. The computer-based method of claim 1, wherein the initiating compensation further comprises directing a third-party service to provide financial compensation to the at least one user.

6. The computer-based method of claim 1, further comprising generating a new opportunity in response to successfully fulfilling the opportunity communicated to the at least one user.

7. The computer-based method of claim 1, further comprising sending a communication to a coordinator of the opportunity in response to fulfillment of the opportunity within the second limited time window.

8. A computing system, comprising:
    a user-based mobile computing device configured to execute an observation application to coordinate observing and collecting of real-world data, the real-world data comprising audio visual data about a product for sale and meta data about the location of the product;
    an observation server computer configured to send a push notification that includes one or more opportunities for observations of real-word data to the user-based mobile computing device, wherein the observation server computer is configured to send the push notification based upon a detected proximity of the user-based mobile computing device to a location associated with one of the opportunities, and configured to receive real world data observed and collected by the user-based mobile computing device, the observation server computer having a pre-established relationship with the user of the mobile computing device through an account associated with the observation application, the opportunity comprising a first limited time window that is a subset of a business day in which observance of real-world data can fulfill the opportunity; and
    a coordinator-based computing device communicatively coupled to the observation server computer and configured to coordinate and control a campaign of opportunities sent by the observation server computer, the coordinator-based computing device configured by a coordinator to establish one or more thresholds of one or more criteria for fulfilling the one or more opportunities that, if fulfilled, triggers a push notification to the user-based mobile computing device indicating fulfillment and triggers a notification to the coordinator-based computing device with details about the fulfillment within a second limited time window;

wherein the observation server computer further comprises a module configured to initiate a compensation to a user of the user-based mobile computing device in response to analysis of observed and collected real-world data within the second limited time window such that the compensation is variably influenced based upon previous receipts of observed and collected real-world data, wherein the analysis determines that the audio visual data and the meta data each meet at least one corresponding threshold of at least one or more corresponding criteria.

9. The computing system of claim 8, wherein the real-world data collected comprises a digital image of a product for sale at a retail location.

10. The computing system of claim 8, wherein real-world data collected comprises a price of a product for sale at a retail location.

11. The computing system of claim 8, wherein the notification of one or more opportunities is influenced by a location of the user-based mobile computing device.

12. The computing system of claim 8, wherein the notification of one or more opportunities further comprises a time limit for fulfillment by an appropriate response from the user-based mobile computing device.

13. The computing system of claim 8, wherein the observation server computer further comprises a module configured to determine if the received data from the user-based mobile computing device fulfills one or more criteria for data collection.

14. The computing system of claim 8, wherein the compensation comprises non-financial compensation.

15. The computing system of claim 8, wherein the user-based mobile computing device comprises one of the group comprised of: a mobile phone, a smart phone, a laptop computer, and handheld computer, a wearable computing device, and an augmented reality device.

16. A cloud-based multi-user observation computing system, comprising:
  a plurality of user-based mobile computing devices each executing an observation application configured to communicate with a server computer hosting observation opportunities;
  a cloud-based observation platform that includes the server computer for hosting the observation opportunities, the observation platform configured to communicate one or more opportunities via one or more push notifications to one or more user-based mobile computing devices based upon a detected proximity of the user-based mobile devices to locations associated with the observation opportunities, the one or more user-based mobile devices having a pre-established account relationship with the observation platform and configured to receive real-world data collected by one or more of the plurality of user-based mobile computing devices, the collected real-world data comprising audio visual data about products for sale and meta data about locations of the products, the opportunity comprising a first limited time window that is a subset of a business day in which observance of real-world data can fulfill the opportunity; and
  a plurality of coordinator-based computing devices communicatively coupled to the observation platform and configured to generate and alter opportunities as part of one or more observation campaigns, each observation campaign having configurable parameters configurable by at least one of the coordinator-based computing devices, each coordinator-based computing device configured by a coordinator to establish one or more thresholds of one or more criteria for fulfilling the one or more opportunities that are communicated to one or more user-based mobile computing devices of the plurality of user-based mobile computing devices via one or more push notification communications;
  wherein the could-based observation platform is configured to analyze collected audio visual data and respective collected meta data that is received within a second limited time window to determine if said collected audio visual data and respective collected meta data meet at least one corresponding threshold of at least one or more corresponding criteria and, in response to the determination, communicating the collected audio visual data and respective collected meta data to one or more coordinator-based computing devices within the second limited time window;
  wherein at least one configurable parameter of each observation campaign comprises a variable compensation parameter that is variable in response to the analysis of said collected audio visual data and respective collected meta data and in response to a total amount of previously received real-world data.

17. The computing system of claim 16, further comprising a retail-location based computer communicatively coupled to the observation platform and configured to receive one or more communication about the real-world data collected.

18. The computing system of claim 16, wherein each coordinator-based computing device is configured to generate campaigns of opportunities that include one or more of the additional configurable parameters from the group comprised of: financial compensation for data collection, non-financial compensation for data collection, time limit for data collection, variable compensation for collected data based on time, variable compensation for collected data based on user reputation, variable compensation for collected data based on geographic location, and data limit for collected data.

19. The computing system of claim 16, further comprising a third-party server computer communicatively coupled to the observation platform and configured to generate a communication in response to receiving collected real-world data.

* * * * *